Sept. 12, 1933.　　　G. E. STANLEY　　　1,926,922
DISK CLUTCH
Filed Aug. 22, 1932
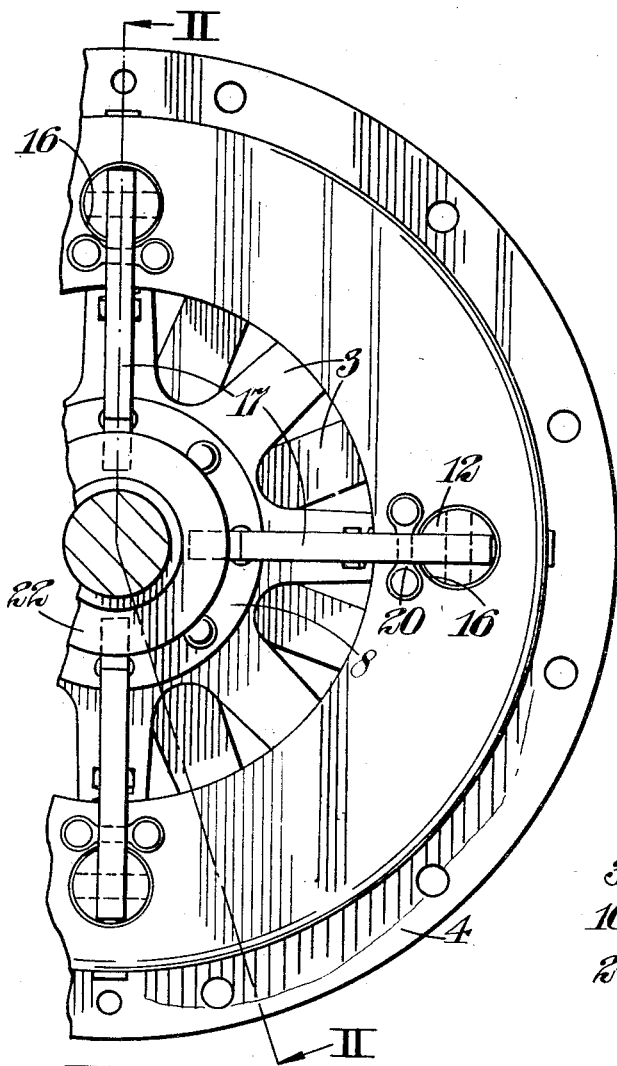
Fig.1.
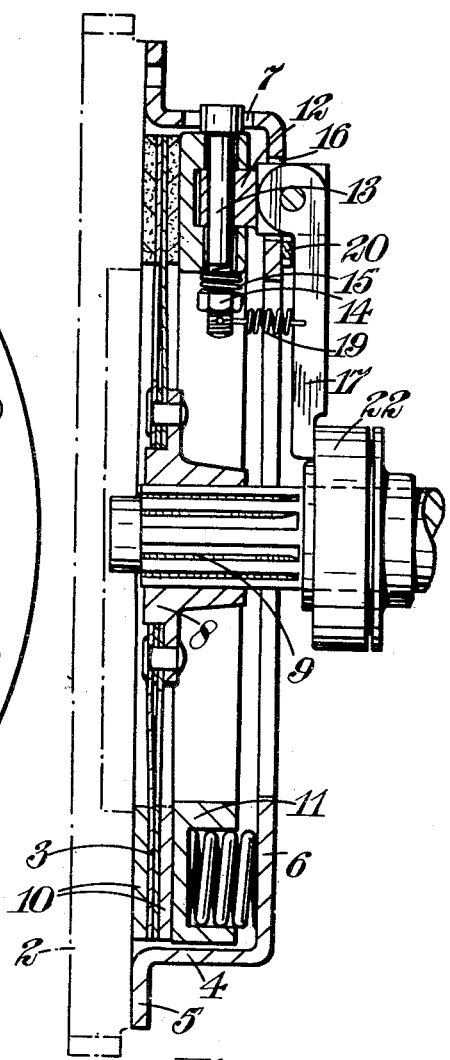
Fig.2.
Fig.3.
Inventor:
George E. Stanley,
By
Mawhinney & Mawhinney,
Attys.

Patented Sept. 12, 1933

1,926,922

UNITED STATES PATENT OFFICE 1,926,922

DISK CLUTCH

George Enoch Stanley, Coventry, England, assignor to Roper & Wreaks Limited, Sheffield, England Application August 22, 1932, Serial No. 629,931, and in Great Britain September 23, 1931

7 Claims. (Cl. 192—68)

This invention relates to disk clutches of the kind wherein a single driven plate is clamped between a face of the driving member and a presser-plate which has a sliding and driving connection with the driving member and is moved by means of levers more or less radially arranged.

Difficulty is often experienced with existing clutches of this type owing to the sticking of the presser-plate during engagement, which causes the load to be taken up unevenly. The chief objects of the present invention are to overcome this difficulty and also to provide an inexpensive construction of clutch.

According to the main feature of this invention, to the levers are pivotally attached pegs, which have a limited pivotal connection with the presser-plate through the medium of connections such as bolts, of which there are preferably four evenly spaced, which have a sliding and driving connection with the driving member.

In the accompanying drawing,

Figure 1 is a fragmentary end elevation, from the presser-plate side, of one form of clutch according to the invention, Figure 2 is a cross-section taken on the line II—II of Figure 1, and Figure 3 is a fragmentary cross-section indicating a modification.

Like numerals indicate like parts throughout the drawing.

In the preferred construction illustrated in Figures 1 and 2, the driving member, as usual, is divided into two parts, one a flywheel 2 the back face of which (with respect to the engine) is engaged by one side of the driven member 3. To this flywheel is attached the second driving member part 4 concentric with the clutch axis for the greater part of its length and with an outwardly-projecting flange 5 at one end, whereby it is attached to the flywheel, and a deep inwardly-projecting flange 6 at the other end. In the concentric portion of the part 4 are formed four longitudinal slots 7, 7 to be engaged by parts on the presser-plate, so providing the driving and sliding connection between the driving member 2, 4 and the presser-plate.

The driven member 3 may be the usual disk carried by a hub 8 free to slide on splines on the driven shaft 9 and provided with non-metallic facings 10, 10. One engages the face on the flywheel 2 and the other a face on the presser-plate 11.

The latter comprises a ring in the back wall of which is formed a number of circular recesses for operating pegs 12, 12 which are circular in section throughout their lengths. The pegs, however, do not project through the presser-plate to the operative surface thereof, which is thus unbroken and provides a uniform friction surface.

Each peg is held in place in its recess by a radial bolt 13 passing through a radial hole in the presser-plate with slight clearance. The heads of these bolts project into the slots 7, 7 in the driving member and form the other portions of the driving and sliding connections. The opposite ends of the bolts project beyond the inner periphery of the presser-plate and receive locking nuts 14, 14 and steadying springs 15, 15. Thus, each bolt can swivel slightly with the peg in relation to the presser-plate, so that the presser-plate is fully floating. Therefore the presser-plate can adjust itself so that all tendency towards sticking is obviated, and it always moves freely even under load, the drive being taken up without "shudder".

The presser-plate 11 is, therefore, only supported by the four engagements with the slots 7, and the pegs 12 can accommodate themselves as they are pivotally mounted. The advantage of having four such peg and bolt connections in preference to any less number is that the presser-plate is always evenly supported. When two of the pegs are aligned with the vertical diameter, as shown in Figure 1, the other two, aligned with the horizontal diameter, take the weight of the presser-plate. In all other positions the load is shared between the four connection points, the two on one side of the vertical diameter having the same load as the two on the other.

The pegs pass through holes 16, 16 in the inwardly-projecting flange 6 with sufficient clearance to prevent any possibility of their binding in the holes, and they are pivoted to radial operating levers 17, 17. Each peg may be hollow and contain a coil spring 18 bearing at one end against the bolt and at the other end against the lever, in order to prevent the latter rattling, as shown in Figure 3. Alternatively, or in addition, springs 19, 19 may be arranged between the inner ends of the bolts and the levers, as shown in Figure 2.

The levers project radially inwards, bearing against projections 20, 20 riveted to the flange 6 (Figures 1 and 2) or a thickened rim 21 (Figure 3) and engage a clutch collar 22 in the ordinary manner.

In this way satisfactory operation of the clutch is ensured and a very inexpensive construction obtained.

What I claim as my invention and desire to secure by Letters Patent of the United States is:—

1. A clutch comprising a driving member having a friction face, a presser-plate, means forming a sliding and driving connection between said driving member and said presser-plate, means having a limited pivotal connection with said presser-plate through said first-mentioned means, and levers, for operating said presser-plate, hinged to said second-mentioned means.

2. A disk clutch comprising driving and driven members, a presser-plate, between which and a face of said driving member said driven member is clamped, bolts mounted on the presser plate and having a sliding and driving connection with the driving member, pegs pivotally mounted for limited movement on the bolts on the presser-plate, and levers hinged to said pegs for operating said presser-plate.

3. A disk clutch comprising a driving member, a driven plate, a presser-plate, between which and a face of said driving member said driven plate is clamped, radially mounted bolts on the presser-plate having a slight clearance therein and having a sliding and driving connection with the driving member, pegs pivotally mounted on the bolts and having a floating connection therethrough with the presser-plate, and operating levers for the presser-plate connected to said pegs.

4. A disk clutch comprising a driving member, a presser-plate supported from said driving member by means of four radial evenly-spaced bolts, said bolts engaging longitudinal slots in said driving member and passing through said presser-plate with slight clearance, and axially-arranged pegs, for operating said presser-plate, hinged to said bolts.

5. A disk clutch, according to claim 3, where steadying springs are arranged between the inner periphery of said presser-plate and locking means on the inner ends of said bolts.

6. A disk clutch, according to claim 1, where springs are arranged between said operating levers and said first-mentioned means.

7. In a disk clutch, an annular presser-plate, radially-arranged bolts passing with clearance through holes in said presser-plate, axially-arranged pegs having holes to receive said bolts, said pegs all extending to the rear of said presser-plate, and radially-arranged levers pivoted to the free ends of said pegs for operating said presser-plate.

GEORGE ENOCH STANLEY.